(12) United States Patent
Zes et al.

(10) Patent No.: US 10,346,804 B2
(45) Date of Patent: Jul. 9, 2019

(54) DETERMINING JOB APPLICANT FIT SCORE

(71) Applicant: Korn Ferry, Los Angeles, CA (US)

(72) Inventors: David A. Zes, Long Beach, CA (US); Andrew R. Simmons, Half Moon Bay, CA (US); Jeff A. Jones, Minneapolis, MN (US); Susan D. D'Mello, Minneapolis, MN (US)

(73) Assignee: Korn Ferry International, Los Angeles, CA (US)

( * ) Notice: Subject to any disclaimer, the term of this patent is extended or adjusted under 35 U.S.C. 154(b) by 796 days.

(21) Appl. No.: 14/245,862

(22) Filed: Apr. 4, 2014

(65) Prior Publication Data

US 2015/0286991 A1    Oct. 8, 2015

(51) Int. Cl.
*G06Q 10/10* (2012.01)

(52) U.S. Cl.
CPC .................. *G06Q 10/1053* (2013.01)

(58) Field of Classification Search
CPC .................................. G06Q 10/1053
USPC ......................................... 705/321
See application file for complete search history.

(56) References Cited

U.S. PATENT DOCUMENTS

| 8,639,547 | B1* | 1/2014 | Judy | .............. | G06Q 10/063112 |
| | | | | | 705/7.11 |
| 8,655,794 | B1 | 2/2014 | Cobb et al. | | |
| 2002/0046074 | A1* | 4/2002 | Barton | .................. | G06Q 10/10 |
| | | | | | 705/321 |
| 2003/0206201 | A1* | 11/2003 | Ly | .......................... | G06Q 10/10 |
| | | | | | 715/835 |
| 2004/0167423 | A1* | 8/2004 | Pillon | .................... | A61B 5/053 |
| | | | | | 600/547 |
| 2005/0026119 | A1* | 2/2005 | Ellis | ..................... | G06Q 10/105 |
| | | | | | 434/219 |
| 2006/0026240 | A1* | 2/2006 | Anthony | ................ | G06Q 30/02 |
| | | | | | 709/206 |
| 2006/0277056 | A1 | 12/2006 | Broberg | | |
| 2007/0234056 | A1* | 10/2007 | Mani | ....................... | G06F 21/32 |
| | | | | | 713/172 |
| 2008/0059290 | A1* | 3/2008 | McFaul | .................. | G06Q 10/06 |
| | | | | | 705/7.14 |

(Continued)

FOREIGN PATENT DOCUMENTS

WO    WO-2015/153910 A1    10/2015

OTHER PUBLICATIONS

W3C, Clipboard Operations . . . ; Dec. 7, 2006; pp. 2-3.*

(Continued)

*Primary Examiner* — Mehmet Yesildag
*Assistant Examiner* — James Webb
(74) *Attorney, Agent, or Firm* — Morrison & Foerster LLP (57) ABSTRACT

Examples of the disclosure are directed toward methods of providing a user interface for a job applicant self-assessment and computing an overall fit score between the applicant and a target job. An ideal job candidate may be specified by an employer on the basis of four categories: competencies, personality traits, motives, and experience levels. Then, an actual job applicant may interact with a user interface to perform a self-assessment on each of the four categories. A fit score may be determined between the applicant and the job for each of the four categories, and the four fit scores may be used to compute an overall fit score between the applicant and the job.

21 Claims, 5 Drawing Sheets

(56) References Cited

U.S. PATENT DOCUMENTS

| | | | |
|---|---|---|---|
| 2009/0299993 A1 | 12/2009 | Novack | |
| 2010/0233663 A1* | 9/2010 | Pennington | G09B 19/00 434/219 |
| 2011/0099122 A1* | 4/2011 | Bright | G06Q 10/04 705/348 |
| 2011/0307300 A1* | 12/2011 | Stockman | G06Q 10/04 705/7.37 |
| 2012/0119096 A1* | 5/2012 | Vija | A61B 6/5205 250/370.08 |
| 2012/0130915 A1* | 5/2012 | Diaz | G06Q 10/06 705/321 |
| 2012/0185777 A1 | 7/2012 | Banerjee | |
| 2013/0097093 A1 | 4/2013 | Kolber et al. | |
| 2013/0262175 A1* | 10/2013 | Deshpande | G06Q 10/06 705/7.25 |
| 2013/0282605 A1* | 10/2013 | Noelting | G06Q 10/1053 705/321 |
| 2014/0039956 A1* | 2/2014 | Cicio, Jr. | G06Q 10/063112 705/7.14 |
| 2014/0244534 A1* | 8/2014 | Simmons | G06Q 10/105 705/328 |
| 2015/0142685 A1* | 5/2015 | Willis | G06Q 10/1053 705/321 |

OTHER PUBLICATIONS

Sung et al.; Essentials of Interactive Computer Graphics: Concepts and Implementation; 2008; CRC Press; p. 39; 1439864241; 9781439864241.*

European Search Report dated Aug. 8, 2017, for EP Application No. 15774269.3, nine pages.

International Search Report dated Jul. 6, 2015, for PCT Application No. PCT/US2015/024145, filed Apr. 2, 2015, one page.

* cited by examiner

| | Strongly Disagree | Disagree | Neutral | Agree | Strongly Agree |
|---|---|---|---|---|---|
| Statement 1 | ○ | ● | ○ | ○ | ○ |
| Statement 2 | ○ | ○ | ○ | ● | ○ |
| Statement 3 | ○ | ○ | ○ | ○ | ○ |
| Statement 4 | ○ | ○ | ○ | ○ | ○ |
| Statement 5 | ○ | ○ | ○ | ○ | ○ |

DETERMINING JOB APPLICANT FIT SCORE

FIELD OF THE DISCLOSURE

This relates generally to methods of determining a fit score between a job applicant and a job.

SUMMARY

Examples of the disclosure are directed toward methods of providing a user interface for a job applicant self-assessment and computing an overall fit score between the applicant and a target job. An ideal job candidate may be specified by an employer on the basis of four categories: competencies, personality traits, motives, and experience levels. Then, an actual job applicant may interact with a user interface to perform a self-assessment on each of the four categories. A fit score may be determined between the applicant and the job for each of the four categories, and the four fit scores may be used to compute an overall fit score between the applicant and the job.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Examples of the disclosure are directed toward methods of providing a user interface for a job applicant self-assessment and computing an overall fit score between the applicant and a target job. An ideal job candidate may be specified by an employer on the basis of four categories: competencies, personality traits, motives, and experience levels. Then, an actual job applicant may interact with a user interface to perform a self-assessment on each of the four categories. A fit score may be determined between the applicant and the job for each of the four categories, and the four fit scores may be used to compute an overall fit score between the applicant and the job.

Although examples of the disclosure may be discussed with reference to the four exemplary categories of competencies, personality traits, motives, and experience levels, the methods disclosed are not so limited and an overall fit score between an applicant and a job may be computed based on any number of various categories.

Figure 1:
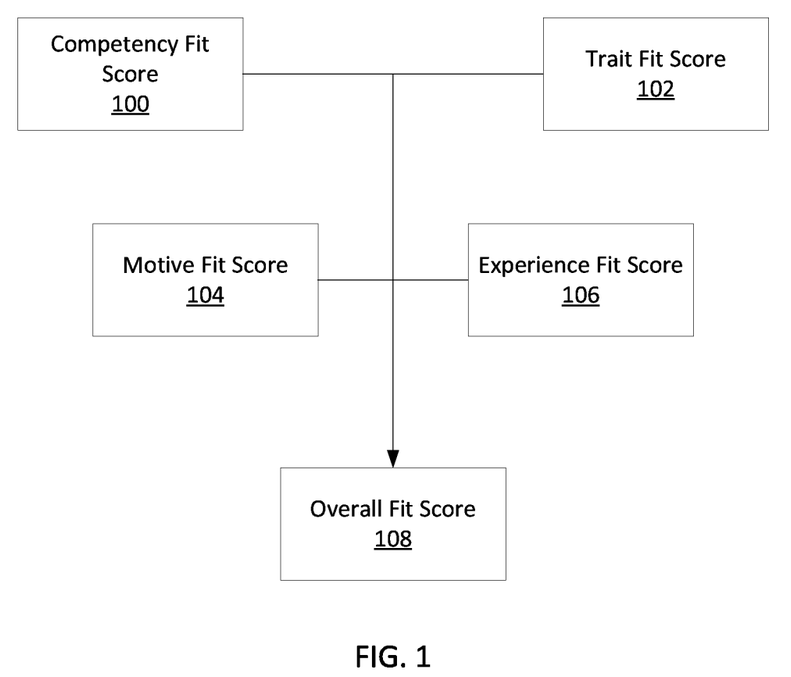
FIG. 1 illustrates an exemplary method of computing an overall fit score between an applicant and a job according to examples of the disclosure.

FIG. 1 illustrates an exemplary method of computing an overall fit score between an applicant and a job according to examples of the disclosure. An overall fit score (108) may be computed based on a competency fit score (100), a trait fit score (102), a motive fit score (104), and an experience fit score (106). Each intermediate fit score 100-106 may be calculated based on user input from a self-assessment, examples of which are illustrated in FIGS. 2-5 and discussed below.

Figure 2:
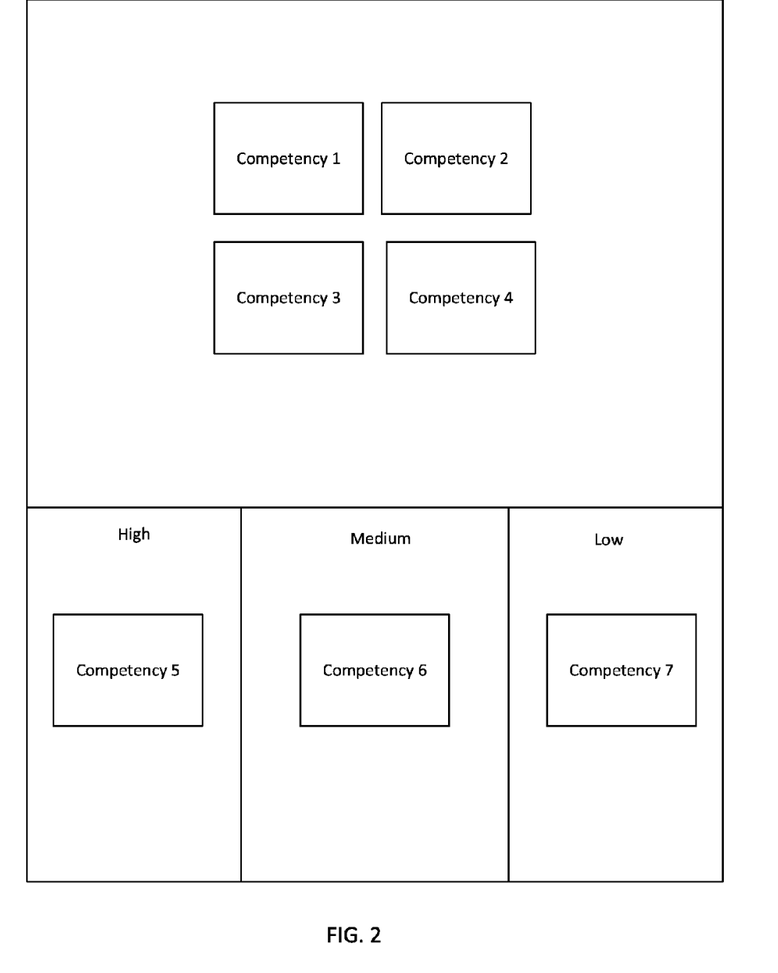
FIG. 2 illustrates an exemplary user interface for an applicant competency determination according to examples of the disclosure.

FIG. 2 illustrates an exemplary user interface for an applicant competency determination according to examples of the disclosure. A user interface may include competency cards, such as "Competency 1," "Competency 2," "Competency 3," and the like. Each competency card may be labeled with a descriptor of the competency it represents, such as "Action oriented," "Dealing with ambiguity," and "Creativity," among other possibilities. An applicant interacting with the user interface may sort the competencies into regions of the user interface marked "High," "Medium," and "Low," respectively, to indicate the user's skill level at each competency. For example, a first card may be associated with a competency of "Creativity." By dragging the "Creativity" card to a medium skill level region of the user interface, the user can indicate that he or she has a medium skill level for "Creativity." By sorting all the cards into respective stacks, a user can provide an assessment of the various competencies associated with the cards.

Based on the user input, an applicant competency vector $x^{(i)}$ may be created for applicant i, wherein each element of the vector $x^{(i)}$ may correspond to a competency, and the value of the element may be determined based on the user input with respect to that competency. For example, the element may be a 3 if the user indicated a high skill level for that competency, a 2 if the user indicated a medium skill level for that competency, and a 1 if the user indicated a low skill level for that competency.

Similarly, a target competency vector $x^{(j)}$ may be created for a job j, wherein each element of the vector $x^{(j)}$ corresponds to a competency, and the value of the element indicates an importance of the competency to the job j. For example, the element may be a 3 if the competency is of high importance to the job, a 2 if the competency is of medium importance to the job, and a 1 if the competency is of low importance to the job.

A plurality of distances $d^{(i,j)}$ may be computed between the applicant competency vector $x^{(i)}$ and the target competency vector $x^{(j)}$ according to equation (1):

$$d^{(i,j)} = \text{abs}(x^{(i)} - x^{(j)}) \quad (1)$$

Further, the weighted sum $s^{(i,j)}$ of the plurality of distances may be calculated according to equation (2):

$$s^{(i,j)} = \frac{\Sigma_k x_k^{(j)} d_k^{(i,j)}}{\Sigma_k x_k^{(j)}} \quad (2)$$

In this example, each distance may be weighted by the corresponding element in the target competency vector—that is, each distance may be weighted by the importance of that competency to the job. The weighted sum of the plurality of distances may indicate a competency fit score, although the score may be further transformed in some examples. For example, the score may be given as a percentile based on a cumulative distribution function (CDF). A normalized competency fit score $z_C$ may be determined by subtracting a mean $\mu_C$, and dividing by a standard deviation $\sigma_C$.

Figure 3:
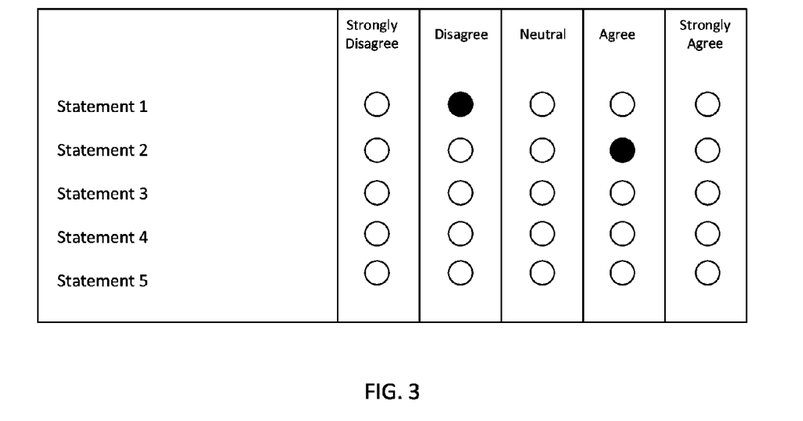
FIG. 3 illustrates an exemplary user interface for an applicant trait determination according to examples of the disclosure.

FIG. 3 illustrates an exemplary user interface for an applicant trait determination according to examples of the disclosure. A user interface may include a plurality of statements (e.g., "Statement 1," "Statement 2," "Statement 3," and the like). Each statement may be indicative of a personality trait, as in a Likert format. Example statements may include, for example, "I have a high level of self-esteem," "I am a sympathetic person," and "I often worry about failure," among numerous other possibilities. Further, the user interface may include a plurality of user interface elements (e.g., radio buttons) corresponding to each statement, and the user may select a user interface element to indicate how well the statement describes a personality trait of the user. For example, in FIG. 3, each statement is displayed with five radio buttons, one of each for "Strongly Disagree," "Disagree," "Neutral," "Agree," and "Strongly Agree," respectively. For "Statement 1," the radio button associated with "Disagree" has been selected, indicating that the user disagrees with "Statement 1" as a descriptor of his or her personality. For "Statement 2," the radio button associated with "Agree" has been selected, indicating that the user agrees with "Statement 2" as a descriptor of his or her personality.

Based on the user input, an applicant trait vector $x^{(i)}$ may be created for applicant i, wherein each element of the vector $x^{(i)}$ may correspond to a trait, and the value of the element may be determined based on the user input with respect to that trait. In some examples, if more than one statement corresponds to each trait, then each element may correspond to an average trait value. For example, there may be p=5 traits and n=3 statements per trait. For the first trait, the first two statements may be positively keyed, and the third negatively keyed. If the applicant records "Agree" (4), "Neutral" (3), and "Strongly Disagree" (1) on the three statements, respectively, then the first element of $x^{(i)}$ may contain the average trait value (4+3+(6−1))/3=4.

Similarly, a target trait vector $x^{(j)}$ may be created for a job j, wherein each element of the vector $x^{(j)}$ corresponds to a particular trait, and the value of the element indicates a desired trait value for the job j. Further, a trait weight vector $w^{(j)}$ may be determined, where each element corresponds to a particular trait, and the value of the element indicates the importance of that trait for the job j. To determine the vectors $x^{(j)}$ and $w^{(j)}$, a plurality of m experts may each provide a single vector y, wherein each element corresponds to a trait, and the value of the element (e.g., 1, 2, or 3) may indicate the importance of that trait to the job j. Then, the vectors $x^{(j)}$ and $w^{(j)}$ may be computed according to equations (3) and (4):

$$x^{(j)} = \frac{p}{nm}\sum_k y_k \quad (3)$$

$$w^{(j)} = \frac{1}{m}\sum_k y_k \quad (4)$$

Then, a plurality of distances $d^{(i,j)}$ may be computed between the applicant trait vector $x^{(i)}$ and the target trait vector $x^{(j)}$ according to equation (5):

$$d^{(i,j)} = \text{abs}(x^{(i)} - x^{(j)}) \quad (5)$$

Further, the weighted sum $s^{(i,j)}$ of the plurality of distances may be calculated according to equation (6):

$$s^{(i,j)} = \frac{\sum_k w_k^{(j)} d_k^{(i,j)}}{\sum_k w_k^{(j)}} \quad (6)$$

In this example, each distance may be weighted by the corresponding element in the trait weight vector. The weighted sum of the plurality of distances may indicate a trait fit score, although the score may be further transformed in some examples. For example, the score may be given as a percentile based on a cumulative distribution function (CDF). A normalized trait fit score $z_T$ may be determined by subtracting a mean $\mu_T$ and dividing by a standard deviation $\sigma_T$.

Figure 4:
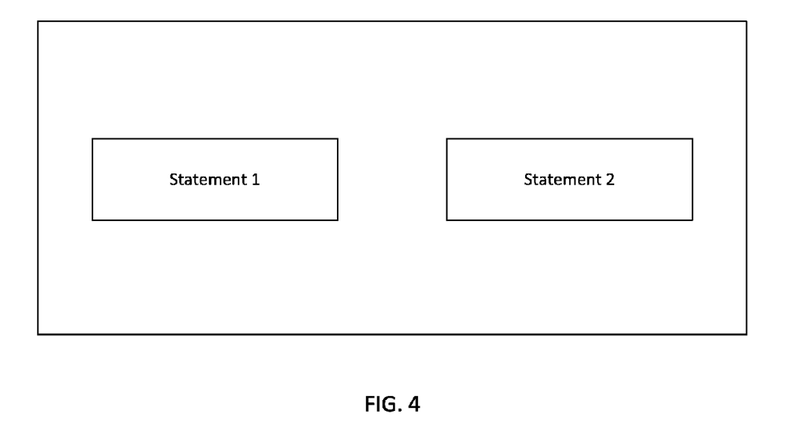
FIG. 4 illustrates an exemplary user interface for an applicant motive determination according to examples of the disclosure.

FIG. 4 illustrates an exemplary user interface for an applicant motive determination according to examples of the disclosure. A user interface may include pairs of statements, such as "Statement 1" and "Statement 2" in FIG. 4, and a user pay select a statement from the pair to indicate that the statement describes him or herself. Once a statement is selected, a new pair of statements may be displayed. Each statement may correspond to a particular motive. For example, 15 statement pairs may be displayed concurrently or in succession, with each statement corresponding to one of 6 motives.

Based on the user input, an applicant motive vector $x^{(i)}$ may be created for applicant i, wherein each element of the vector $x^{(i)}$ corresponds to a motive, and the value of the element may be a count of the number of statements corresponding to the motive that were chosen by the user. For example, if the user chose three statements corresponding to the first motive and zero statements corresponding to the second motive, then the first element would be a 3 and the second element would be a 0.

Similarly, a target motive vector $x^{(j)}$ may be created for job j, wherein each element of the vector $x^{(j)}$ corresponds to a particular motive, and the value of the element indicates the importance of the motive to the job j. For example, the element may be a 3 if the motive is of high importance to the job, a 2 if the motive is of medium importance to the job, and a 1 if the motive is of low importance to the job.

First, the applicant motive vector and the target motive vector may be standardized so that distances between the two can be computed. An example standardization is given in equations (7) and (8) (the values in these and other equations are merely example parameters, and other parameter values are possible in various examples):

$$z^{(i)} = \sqrt{\frac{4}{5}}(x^{(i)} - 2.5) \quad (7)$$

$$z^{(j)} = \sqrt{\frac{3}{2}}(x^{(j)} - 2.0) \quad (8)$$

Then, a plurality of distances $d^{(i,j)}$ may be computed between the standardized applicant motive vector $z^{(i)}$ and the standardized target motive vector $z^{(j)}$ according to equation (9):

$$d^{(i,j)} = \text{abs}(z^{(i)} - z^{(j)}) \quad (9)$$

Further, the weighted sum $s^{(i,j)}$ of the plurality of distances may be calculated according to equation (10):

$$s^{(i,j)} = \frac{\sum_k x_k^{(j)} d_k^{(i,j)}}{\sum_k x_k^{(j)}} \qquad (10)$$

In this example, each distance may be weighted by the corresponding element in the target motive vector. The weighted sum of the plurality of distances may indicate a motive fit score, although the score may be further transformed in some examples. For example, the score may be given as a percentile based on a cumulative distribution function (CDF). A normalized motive fit score $z_M$ may be determined by subtracting a mean $\mu_M$ and dividing by a standard deviation $\sigma_M$.

Figure 5:
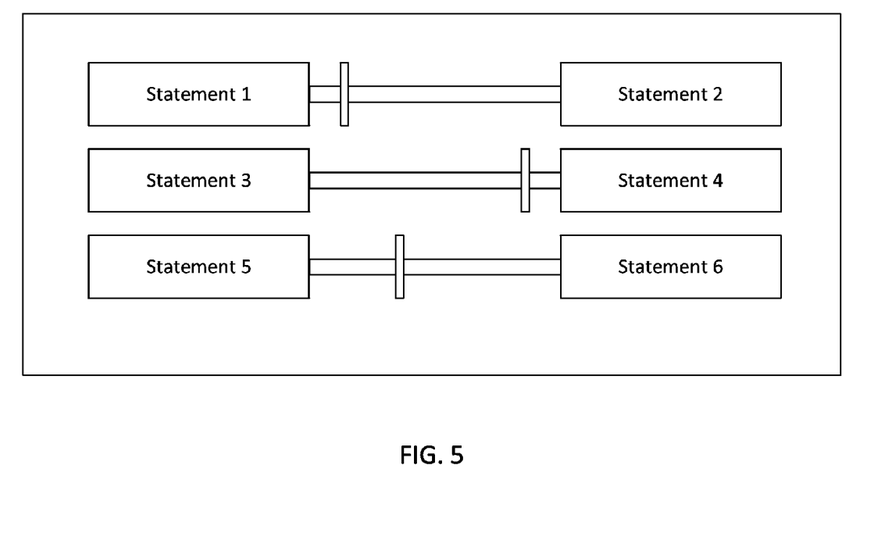
FIG. 5 illustrates an exemplary user interface for an applicant experience determination according to examples of the disclosure.

FIG. 5 illustrates an exemplary user interface for an applicant experience determination according to examples of the disclosure. A user interface may include pairs of statements, each pair associated with a particular experience. The user interface may further include a scale associated with each pair, and the user may interact with a scale to indicate which statement of the associated pair more closely describes him or herself, thus indicating an experience level for the corresponding experience. The scale may include 4 or 5 different levels, among other possibilities.

Based on the user input, an applicant experience vector $x^{(i)}$ may be created for applicant i, wherein each element of the vector $x^{(i)}$ may correspond to an experience, and the value of the element may be determined based on the user input with respect to that experience. For example, the value may correspond to the experience level chosen by the user through manipulation of the scale corresponding to that experience.

Similarly, a target experience vector $x^{(j)}$ may be created for a job j, wherein each element of the vector $x^{(j)}$ corresponds to an experience, and the value of the element indicates the desired experience level.

A plurality of distances $d^{(i,j)}$ may be computed between the applicant experience vector $x^{(i)}$ and the target experience vector $x^{(j)}$ according to equation (11):

$$d^{(i,j)} = abs(x^{(i)} - x^{(j)}) \qquad (11)$$

Further, the weighted sum $s^{(i,j)}$ of the plurality of distances may be calculated according to equation (12):

$$s^{(i,j)} = \frac{1}{m} \sum_k d_k^{(i,j)} \qquad (12)$$

In this example, each distance may be weighted by dividing by the total number of experiences m. The weighted sum of the plurality of distances may indicate an experience fit score, although the score may be further transformed in some examples. For example, the score may be given as a percentile based on a cumulative distribution function (CDF). A normalized experience fit score $z_E$ may be determined by subtracting a mean $\mu_E$ and dividing by a standard deviation $\sigma_E$.

An overall fit score may be computed by a weighted sum of the normalized fit scores $z_C$, $z_T$, $z_M$, and $z_E$, and the overall fit score may be given as a percentile based on a cumulative distribution function (CDF).

Figure 6:
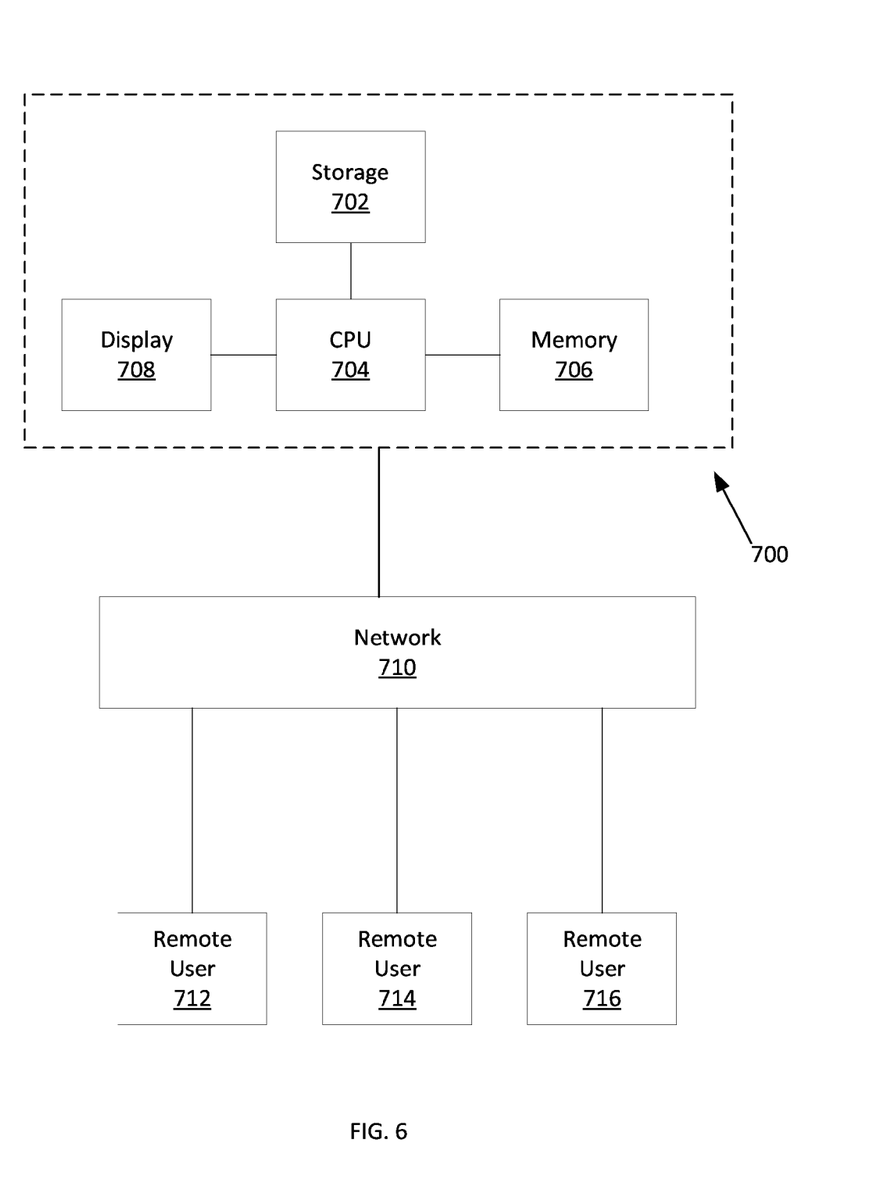
FIG. 6 illustrates an exemplary system for determining a causation score according to examples of the disclosure.

FIG. 6 illustrates an exemplary system 700 for determining a fit score according to examples of the disclosure. The system 700 can include a CPU 704, storage 702, memory 706, and display 708. The CPU 704 can perform the methods illustrated in and described with reference to FIGS. 1-5. Additionally, the storage 702 can store data and instructions for performing the methods illustrated in and described with reference to FIGS. 1-5. The storage can be any non-transitory computer readable storage medium, such as a solid-state drive or a hard disk drive, among other possibilities. A user interface, such as those illustrated in FIGS. 2-5, may be displayed on the display 708.

The system 700 can communicate with one or more remote users 712, 714, and 716 over a wired or wireless network 710, such as a local area network, wide-area network, or internet, among other possibilities. The steps of the methods disclosed herein may be performed on a single system 700 or on several systems including the remote users 712, 714, and 716.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A computer-implemented method of computing a fit score for an applicant and a job, the method comprising:
displaying, on a display, a user interface that includes:
a plurality of competency cards, including a first competency card corresponding to a first competency and a second competency card corresponding to a second competency, different from the first competency; and
a plurality of regions corresponding to different skill levels;
while displaying the user interface, receiving user input moving:
the first competency card to a given region of the plurality of regions to indicate a skill level of the applicant in the first competency, and
the second competency card to a given region of the plurality of regions to indicate a skill level of the applicant in the second competency;
determining:
a numerical value, for the first competency, indicating the skill level of the applicant in the first competency based on the given region of the plurality of regions to which the first competency card was moved; and
a numerical value, for the second competency, indicating the skill level of the applicant in the second competency based on the given region of the plurality of regions to which the second competency card was moved;
obtaining a target competency vector associated with the job, the target competency vector including:
a first entry corresponding to the first competency and indicating an importance of the first competency to the job, and
a second entry corresponding to the second competency and indicating an importance of the second competency to the job;
obtaining an applicant competency vector based on the user input from the applicant, the applicant competency vector including:
a first entry corresponding to the first competency, a value of which is the determined numerical value for the first competency indicating the skill level of the applicant in the first competency, and
a second entry corresponding to the second competency, a value of which is the determined numerical value for the second competency indicating the skill level of the applicant in the second competency;
computing a plurality of distances, the plurality of distances including distances between the first and second entries of the target competency vector and the applicant competency vector; displaying, on a display, a user interface that includes a plurality of statements, including a first statement corresponding to a first motive and a second statement corresponding to a second motive, different from the first motive;
while displaying the user interface, receiving user input selecting one or more statements of the plurality of statements to indicate that the selected statements describe the applicant instead of the one or more statements of the plurality of statements not selected by the user;
determining:
  a numerical value, for the first motive, indicating a degree that the first motive describes the applicant based on a number of statements corresponding to the first motive selected by the user; and
  a numerical value, for the second motive, indicating a degree that the second motive describes the applicant based on a number of statements corresponding to the second motive selected by the user;
obtaining a target motive vector associated with the job, the target motive vector including:
  a first entry corresponding to the first motive and indicating an importance of the first motive to the job, and
  a second entry corresponding to the second motive and indicating an importance of the second motive to the job;
obtaining an applicant motive count vector based on user input from the applicant, the applicant motive count vector including:
  a first entry corresponding to the first motive, a value of which is the determined numerical value for the first motive indicating the degree to which the applicant has indicated that the first motive describes the applicant, and
  a second entry corresponding to the second motive, a value of which is the determined numerical value for the second motive indicating the degree to which the applicant has indicated that the second motive describes the applicant;
computing a standardized target motive vector and a standardized applicant motive vector from the target motive vector and the applicant motive vector, respectively; and
computing a fit score of the applicant for the job based on a weighted sum of the plurality of distances, the standardized target motive vector, and the standardized applicant motive vector.

2. The method of claim 1, the method further comprising:
obtaining a target trait vector associated with the job, the target trait vector including:
  a first entry corresponding to a first trait and indicating a desired trait value for the first trait for the job, and
  a second entry corresponding to a second trait, different from the first trait, and indicating a desired trait value for the second trait for the job;
obtaining an applicant trait vector based on user input from the applicant, the applicant trait vector including:
  a first entry corresponding to the first trait and indicating a trait value for the first trait for the applicant, and
  a second entry corresponding to the second trait and indicating a trait value for the second trait for the applicant; and
computing a plurality of target weights, each corresponding to a trait of the first and second traits, and each target weight indicating an importance of the corresponding trait to the job;
wherein computing the fit score is further based on the target trait vector, the applicant trait vector, and the plurality of target weights.

3. The method of claim 1, wherein computing the fit score includes computing a competency fit score, a trait fit score, a motive fit score, and an experience fit score.

4. The method of claim 3, wherein computing the fit score includes computing a weighted fit score sum of the competency fit score, the trait fit score, the motive fit score, and the experience fit score.

5. The method of claim 1, the method further comprising transforming the fit score using a cumulative distribution function.

6. A non-transitory computer readable storage medium storing instructions, which when executed by an electronic device, cause the electronic device to perform a method of computing a fit score for an applicant and a job, the method comprising:
displaying, on a display, a user interface that includes:
  a plurality of competency cards, including a first competency card corresponding to a first competency and a second competency card corresponding to a second competency, different from the first competency; and
  a plurality of regions corresponding to different skill levels;
while displaying the user interface, receiving user input moving:
  the first competency card to a given region of the plurality of regions to indicate a skill level of the applicant in the first competency, and
  the second competency card to a given region of the plurality of regions to indicate a skill level of the applicant in the second competency;
determining:
  a numerical value, for the first competency, indicating the skill level of the applicant in the first competency based on the given region of the plurality of regions to which the first competency card was moved; and
  a numerical value, for the second competency, indicating the skill level of the applicant in the second competency based on the given region of the plurality of regions to which the second competency card was moved;
obtaining a target competency vector associated with the job, the target competency vector including:
  a first entry corresponding to the first competency and indicating an importance of the first competency to the job, and
  a second entry corresponding to the second competency and indicating an importance of the second competency to the job;
obtaining an applicant competency vector based on the user input from the applicant, the applicant competency vector including:
  a first entry corresponding to the first competency, a value of which is the determined numerical value for the first competency indicating the skill level of the applicant in the first competency, and
  a second entry corresponding to the second competency, a value of which is the determined numerical value for the second competency indicating the skill level of the applicant in the second competency;
computing a plurality of distances, the plurality of distances including distances between the first and second entries of the target competency vector and the applicant competency vector;
displaying, on a display, a user interface that includes a plurality of statements, including a first statement corresponding to a first motive and a second statement corresponding to a second motive, different from the first motive;
while displaying the user interface, receiving user input selecting one or more statements of the plurality of statements to indicate that the selected statements describe the applicant instead of the one or more statements of the plurality of statements not selected by the user;
determining:
　a numerical value, for the first motive, indicating a degree that the first motive describes the applicant based on a number of statements corresponding to the first motive selected by the user; and
　a numerical value, for the second motive, indicating a degree that the second motive describes the applicant based on a number of statements corresponding to the second motive selected by the user;
obtaining a target motive vector associated with the job, the target motive vector including:
　a first entry corresponding to the first motive and indicating an importance of the first motive to the job, and
　a second entry corresponding to the second motive and indicating an importance of the second motive to the job;
obtaining an applicant motive count vector based on user input from the applicant, the applicant motive count vector including:
　a first entry corresponding to the first motive, a value of which is the determined numerical value for the first motive indicating the degree to which the applicant has indicated that the first motive describes the applicant, and
　a second entry corresponding to the second motive, a value of which is the determined numerical value for the second motive indicating the degree to which the applicant has indicated that the second motive describes the applicant;
computing a standardized target motive vector and a standardized applicant motive vector from the target motive vector and the applicant motive vector, respectively; and
computing a fit score of the applicant for the job based on a weighted sum of the plurality of distances, the standardized target motive vector, and the standardized applicant motive vector.

7. The non-transitory computer readable storage medium of claim 6, the method further comprising:
obtaining a target trait vector associated with the job, the target trait vector including:
　a first entry corresponding to a first trait and indicating a desired trait value for the first trait for the job, and
　a second entry corresponding to a second trait, different from the first trait, and indicating a desired trait value for the second trait for the job;
obtaining an applicant trait vector based on user input from the applicant, the applicant trait vector including:
　a first entry corresponding to the first trait and indicating a trait value for the first trait for the applicant, and
　a second entry corresponding to the second trait and indicating a trait value for the second trait for the applicant; and
computing a plurality of target weights, each corresponding to a trait of the first and second traits, and each target weight indicating an importance of the corresponding trait to the job;
wherein computing the fit score is further based on the target trait vector, the applicant trait vector, and the plurality of target weights.

8. The non-transitory computer readable storage medium of claim 6, wherein computing the fit score includes computing a competency fit score, a trait fit score, a motive fit score, and an experience fit score.

9. The non-transitory computer readable storage medium of claim 8, wherein computing the fit score includes computing a weighted fit score sum of the competency fit score, the trait fit score, the motive fit score, and the experience fit score.

10. The non-transitory computer readable storage medium of claim 6, the method further comprising transforming the fit score using a cumulative distribution function.

11. An electronic device comprising:
a processor to execute instructions; and
a memory coupled with the processor to store instructions, which when executed by the processor, cause the processor to perform a method of computing a fit score for an applicant and a job, the method comprising:
displaying, on a display, a user interface that includes:
　a plurality of competency cards, including a first competency card corresponding to a first competency and a second competency card corresponding to a second competency, different from the first competency; and
　a plurality of regions corresponding to different skill levels;
while displaying the user interface, receiving user input moving:
　the first competency card to a given region of the plurality of regions to indicate a skill level of the applicant in the first competency, and
　the second competency card to a given region of the plurality of regions to indicate a skill level of the applicant in the second competency;
determining:
　a numerical value, for the first competency, indicating the skill level of the applicant in the first competency based on the given region of the plurality of regions to which the first competency card was moved; and
　a numerical value, for the second competency, indicating the skill level of the applicant in the second competency based on the given region of the plurality of regions to which the second competency card was moved;
obtaining a target competency vector associated with the job, the target competency vector including:
　a first entry corresponding to the first competency and indicating an importance of the first competency to the job, and
　a second entry corresponding to the second competency and indicating an importance of the second competency to the job;
obtaining an applicant competency vector based on the user input from the applicant, the applicant competency vector including:

a first entry corresponding to the first competency, a value of which is the determined numerical value for the first competency indicating the skill level of the applicant in the first competency, and a second entry corresponding to the second competency, a value of which is the determined numerical value for the second competency indicating the skill level of the applicant in the second competency;

computing a plurality of distances, the plurality of distances including distances between the first and second entries of the target competency vector and the applicant competency vector;

displaying, on a display, a user interface that includes a plurality of statements, including a first statement corresponding to a first motive and a second statement corresponding to a second motive, different from the first motive;

while displaying the user interface, receiving user input selecting one or more statements of the plurality of statements to indicate that the selected statements describe the applicant instead of the one or more statements of the plurality of statements not selected by the user;

determining:
a numerical value, for the first motive, indicating a degree that the first motive describes the applicant based on a number of statements corresponding to the first motive selected by the user; and a numerical value, for the second motive, indicating a degree that the second motive describes the applicant based on a number of statements corresponding to the second motive selected by the user;

obtaining a target motive vector associated with the job, the target motive vector including:
a first entry corresponding to the first motive and indicating an importance of the first motive to the job, and a second entry corresponding to the second motive and indicating an importance of the second motive to the job;

obtaining an applicant motive count vector based on user input from the applicant, the applicant motive count vector including:
a first entry corresponding to the first motive, a value of which is the determined numerical value for the first motive indicating the degree to which the applicant has indicated that the first motive describes the applicant, and a second entry corresponding to the second motive, a value of which is the determined numerical value for the second motive indicating the degree to which the applicant has indicated that the second motive describes the applicant;

computing a standardized target motive vector and a standardized applicant motive vector from the target motive vector and the applicant motive vector, respectively; and computing a fit score of the applicant for the job based on a weighted sum of the plurality of distances, the standardized target motive vector, and the standardized applicant motive vector.

12. The electronic device of claim 11, the method further comprising:
obtaining a target trait vector associated with the job, the target trait vector including:
a first entry corresponding to a first trait and indicating a desired trait value for the first trait for the job, and a second entry corresponding to a second trait, different from the first trait, and indicating a desired trait value for the second trait for the job;

obtaining an applicant trait vector based on user input from the applicant, the applicant trait vector including:
a first entry corresponding to the first trait and indicating a trait value for the first trait for the applicant, and a second entry corresponding to the second trait and indicating a trait value for the second trait for the applicant; and computing a plurality of target weights, each corresponding to a trait of the first and second traits, and each target weight indicating an importance of the corresponding trait to the job;

wherein computing the fit score is further based on the target trait vector, the applicant trait vector, and the plurality of target weights.

13. The electronic device of claim 11, wherein computing the fit score includes computing a competency fit score, a trait fit score, a motive fit score, and an experience fit score.

14. The electronic device of claim 13, wherein computing the fit score includes computing a weighted fit score sum of the competency fit score, the trait fit score, the motive fit score, and the experience fit score.

15. The electronic device of claim 11, the method further comprising transforming the fit score using a cumulative distribution function.

16. The method of claim 1, the method further comprising normalizing the fit score by subtracting a mean and dividing by a standard deviation.

17. The non-transitory computer readable storage medium of claim 6, the method further comprising normalizing the fit score by subtracting a mean and dividing by a standard deviation.

18. The electronic device of claim 11, the method further comprising normalizing the fit score by subtracting a mean and dividing by a standard deviation.

19. A computer-implemented method of computing a fit score for an applicant and a job, the method comprising:
displaying, on a display, a user interface that includes:
a plurality of competency cards, including a first competency card corresponding to a first competency and a second competency card corresponding to a second competency, different from the first competency; and a plurality of regions corresponding to different skill levels;

while displaying the user interface, receiving user input moving:
the first competency card to a given region of the plurality of regions to indicate a skill level of the applicant in the first competency, and the second competency card to a given region of the plurality of regions to indicate a skill level of the applicant in the second competency;

determining:
a numerical value, for the first competency, indicating the skill level of the applicant in the first competency based on the given region of the plurality of regions to which the first competency card was moved; and a numerical value, for the second competency, indicating the skill level of the applicant in the second competency based on the given region of the plurality of regions to which the second competency card was moved;

obtaining a target competency vector associated with the job, the target competency vector including:

a first entry corresponding to the first competency and
indicating an importance of the first competency to
the job, and
a second entry corresponding to the second competency
and indicating an importance of the second competency to the job;
obtaining an applicant competency vector based on the
user input from the applicant, the applicant competency
vector including:
a first entry corresponding to the first competency, a
value of which is the determined numerical value for
the first competency indicating the skill level of the
applicant in the first competency, and
a second entry corresponding to the second competency, a value of which is the determined numerical
value for the second competency indicating the skill
level of the applicant in the second competency;
computing a plurality of distances, the plurality of distances including distances between the first and second
entries of the target competency vector and the applicant competency vector;
displaying, on a display, a user interface that includes a
plurality of scales, including a first scale corresponding
to a first experience and a second scale corresponding
to a second experience, different from the first experience;
while displaying the user interface, receiving user input
moving:
an indicator on the first scale to a given level of the
plurality of levels on the first scale to indicate an
experience level of the applicant in the first experience, and
an indicator on the second scale to a given level of the
plurality of levels on the second scale to indicate an
experience level of the applicant in the second experience;
determining:
a numerical value, for the first experience, indicating
the experience level of the applicant in the first
experience based on the given level of the plurality
of levels to which the indicator on the first scale was
moved; and
a numerical value, for the second experience, indicating
the experience level of the applicant in the second
experience based on the given level of the plurality
of levels to which the indicator on the second scale
was moved;
obtaining a target experience vector associated with the
job, the target experience vector including:
a first entry corresponding to the first experience and
indicating a desired experience level for the first
experience for the job, and
a second entry corresponding to the second experience
and indicating a desired experience level for the
second experience for the job;
obtaining an applicant experience vector based on user
input from the applicant, the applicant experience vector including:
a first entry corresponding to the first experience, a
value of which is the determined numerical value for
the first experience indicating the experience level of
the applicant in the first experience, and
a second entry corresponding to the second experience,
a value of which is the determined numerical value
for the second experience indicating the experience
level of the applicant in the second experience;

computing an additional plurality of distances, the additional plurality of distances including distances
between the first and second entries of the target
experience vector and the applicant experience vector;
and
computing a fit score of the applicant for the job based on
a weighted sum of the plurality of distances and the
additional plurality of distances.

20. A non-transitory computer readable storage medium
storing instructions, which when executed by an electronic
device, cause the electronic device to perform a method of
computing a fit score for an applicant and a job, the method
comprising:
displaying, on a display, a user interface that includes:
a plurality of competency cards, including a first competency card corresponding to a first competency and
a second competency card corresponding to a second
competency, different from the first competency; and
a plurality of regions corresponding to different skill
levels;
while displaying the user interface, receiving user input
moving:
the first competency card to a given region of the
plurality of regions to indicate a skill level of the
applicant in the first competency, and
the second competency card to a given region of the
plurality of regions to indicate a skill level of the
applicant in the second competency;
determining:
a numerical value, for the first competency, indicating
the skill level of the applicant in the first competency
based on the given region of the plurality of regions
to which the first competency card was moved; and
a numerical value, for the second competency, indicating the skill level of the applicant in the second
competency based on the given region of the plurality of regions to which the second competency card
was moved;
obtaining a target competency vector associated with the
job, the target competency vector including:
a first entry corresponding to the first competency and
indicating an importance of the first competency to
the job, and
a second entry corresponding to the second competency
and indicating an importance of the second competency to the job;
obtaining an applicant competency vector based on the
user input from the applicant, the applicant competency
vector including:
a first entry corresponding to the first competency, a
value of which is the determined numerical value for
the first competency indicating the skill level of the
applicant in the first competency, and
a second entry corresponding to the second competency, a value of which is the determined numerical
value for the second competency indicating the skill
level of the applicant in the second competency;
computing a plurality of distances, the plurality of distances including distances between the first and second
entries of the target competency vector and the applicant competency vector;
displaying, on a display, a user interface that includes a
plurality of scales, including a first scale corresponding
to a first experience and a second scale corresponding
to a second experience, different from the first experience;

while displaying the user interface, receiving user input moving:
an indicator on the first scale to a given level of the plurality of levels on the first scale to indicate an experience level of the applicant in the first experience, and
an indicator on the second scale to a given level of the plurality of levels on the second scale to indicate an experience level of the applicant in the second experience;

determining:
a numerical value, for the first experience, indicating the experience level of the applicant in the first experience based on the given level of the plurality of levels to which the indicator on the first scale was moved; and
a numerical value, for the second experience, indicating the experience level of the applicant in the second experience based on the given level of the plurality of levels to which the indicator on the second scale was moved;

obtaining a target experience vector associated with the job, the target experience vector including:
a first entry corresponding to the first experience and indicating a desired experience level for the first experience for the job, and
a second entry corresponding to the second experience and indicating a desired experience level for the second experience for the job;

obtaining an applicant experience vector based on user input from the applicant, the applicant experience vector including:
a first entry corresponding to the first experience, a value of which is the determined numerical value for the first experience indicating the experience level of the applicant in the first experience, and
a second entry corresponding to the second experience, a value of which is the determined numerical value for the second experience indicating the experience level of the applicant in the second experience;

computing an additional plurality of distances, the additional plurality of distances including distances between the first and second entries of the target experience vector and the applicant experience vector; and computing a fit score of the applicant for the job based on a weighted sum of the plurality of distances and the additional plurality of distances.

21. An electronic device comprising:
a processor to execute instructions; and
a memory coupled with the processor to store instructions, which when executed by the processor, cause the processor to perform a method of computing a fit score for an applicant and a job, the method comprising:
displaying, on a display, a user interface that includes:
a plurality of competency cards, including a first competency card corresponding to a first competency and a second competency card corresponding to a second competency, different from the first competency; and
a plurality of regions corresponding to different skill levels;

while displaying the user interface, receiving user input moving:
the first competency card to a given region of the plurality of regions to indicate a skill level of the applicant in the first competency, and
the second competency card to a given region of the plurality of regions to indicate a skill level of the applicant in the second competency;

determining:
a numerical value, for the first competency, indicating the skill level of the applicant in the first competency based on the given region of the plurality of regions to which the first competency card was moved; and
a numerical value, for the second competency, indicating the skill level of the applicant in the second competency based on the given region of the plurality of regions to which the second competency card was moved;

obtaining a target competency vector associated with the job, the target competency vector including:
a first entry corresponding to the first competency and indicating an importance of the first competency to the job, and
a second entry corresponding to the second competency and indicating an importance of the second competency to the job;

obtaining an applicant competency vector based on the user input from the applicant, the applicant competency vector including:
a first entry corresponding to the first competency, a value of which is the determined numerical value for the first competency indicating the skill level of the applicant in the first competency, and
a second entry corresponding to the second competency, a value of which is the determined numerical value for the second competency indicating the skill level of the applicant in the second competency;

computing a plurality of distances, the plurality of distances including distances between the first and second entries of the target competency vector and the applicant competency vector;

displaying, on a display, a user interface that includes a plurality of scales, including a first scale corresponding to a first experience and a second scale corresponding to a second experience, different from the first experience;

while displaying the user interface, receiving user input moving:
an indicator on the first scale to a given level of the plurality of levels on the first scale to indicate an experience level of the applicant in the first experience, and
an indicator on the second scale to a given level of the plurality of levels on the second scale to indicate an experience level of the applicant in the second experience;

determining:
a numerical value, for the first experience, indicating the experience level of the applicant in the first experience based on the given level of the plurality of levels to which the indicator on the first scale was moved; and
a numerical value, for the second experience, indicating the experience level of the applicant in the second experience based on the given level of the plurality of levels to which the indicator on the second scale was moved;

obtaining a target experience vector associated with the job, the target experience vector including:
a first entry corresponding to the first experience and indicating a desired experience level for the first experience for the job, and a second entry corresponding to the second experience and indicating a desired experience level for the second experience for the job;

obtaining an applicant experience vector based on user input from the applicant, the applicant experience vector including:
- a first entry corresponding to the first experience, a value of which is the determined numerical value for the first experience indicating the experience level of the applicant in the first experience, and
- a second entry corresponding to the second experience, a value of which is the determined numerical value for the second experience indicating the experience level of the applicant in the second experience;

computing an additional plurality of distances, the additional plurality of distances including distances between the first and second entries of the target experience vector and the applicant experience vector; and computing a fit score of the applicant for the job based on a weighted sum of the plurality of distances and the additional plurality of distances.

* * * * *